(12) United States Patent
Masuda et al.

(10) Patent No.: US 9,531,173 B2
(45) Date of Patent: Dec. 27, 2016

(54) WIRE HARNESS AND METHOD OF MAINTAINING SHAPE THEREOF

(71) Applicant: YAZAKI CORPORATION, Tokyo (JP)

(72) Inventors: Michihisa Masuda, Toyota (JP); Hidehiro Ichikawa, Kosai (JP); Masahiro Takamatsu, Kosai (JP); Shigemi Hashizawa, Kosai (JP)

(73) Assignee: YAZAKI CORPORATION, Tokyo (JP)

( * ) Notice: Subject to any disclaimer, the term of this patent is extended or adjusted under 35 U.S.C. 154(b) by 60 days.

(21) Appl. No.: 14/159,606

(22) Filed: Jan. 21, 2014

(65) Prior Publication Data

US 2014/0131062 A1    May 15, 2014

Related U.S. Application Data

(63) Continuation of application No. PCT/JP2012/068506, filed on Jul. 20, 2012.

(30) Foreign Application Priority Data

Jul. 21, 2011 (JP) ................. 2011-160139
Jan. 10, 2012 (JP) ................. 2012-002069

(51) Int. Cl.
*H02G 3/04* (2006.01)
*B60R 16/02* (2006.01)

(52) U.S. Cl.
CPC ......... *H02G 3/0406* (2013.01); *B60R 16/0215* (2013.01); *H02G 3/0468* (2013.01)

(58) Field of Classification Search
CPC .. H02G 3/0406; H02G 3/0468; B60R 16/0215
(Continued)

(56) References Cited

U.S. PATENT DOCUMENTS 5,829,485 A * 11/1998 Fatato .................. H02G 3/0468
138/110
5,958,315 A    9/1999 Fatato et al.
(Continued)

FOREIGN PATENT DOCUMENTS

CN    103141001 A    6/2013
EP    1890071 A2    2/2008
(Continued)

OTHER PUBLICATIONS

US20130284484.*
(Continued)

*Primary Examiner* — Dhirubhai R Patel
(74) *Attorney, Agent, or Firm* — Morgan, Lewis & Bockius LLP (57) ABSTRACT

A wire harness includes a conduction path, and a flexible sheathing member through which the conduction path passes and which has recessed sections and protruded sections. The recessed sections and the protruded sections extend in a circumferential direction on the surface of the sheathing member and are formed alternately along a longitudinal direction of the sheathing member. A curing-type adhesive or resin containing the adhesive is supplied to the recessed sections of a bent part which is formed when the wire harness is bent, and cured while the bent part is maintained in a bent shape.

3 Claims, 9 Drawing Sheets

(58) Field of Classification Search
USPC .................................... 174/68.1, 68.3, 72 A
See application file for complete search history.

(56) References Cited

U.S. PATENT DOCUMENTS

| | | | | |
|---|---|---|---|---|
| 7,829,789 | B2* | 11/2010 | Yamaguchi | .................. 174/72 A |
| 2005/0011687 | A1 | 1/2005 | Yamaguchi et al. | |
| 2011/0120747 | A1 | 5/2011 | Muneyasu et al. | |
| 2013/0180776 | A1 | 7/2013 | Gotou et al. | |
| 2013/0256029 | A1* | 10/2013 | Toyama | .............. B60R 16/0215 174/68.3 |

FOREIGN PATENT DOCUMENTS

| | | | |
|---|---|---|---|
| EP | 2312590 | A1 | 4/2011 |
| EP | 2624387 | A1 | 8/2013 |
| JP | 2003-029052 | A | 1/2003 |
| JP | 2004-023903 | A | 1/2004 |
| JP | 2004-224156 | A | 8/2004 |
| JP | 2004-324803 | A | 11/2004 |
| JP | 2011-138740 | A | 7/2011 |
| WO | 98/57403 | A1 | 12/1998 |

OTHER PUBLICATIONS

Extended European Search Report dated Feb. 25, 2015, for corresponding European Application No. 12815121.4.
International Search Report dated Sep. 25, 2012 for International application No. PCT/JP2012/068506.
Written Opinion of the International Searching Authority dated Sep. 25, 2012 for International application No. PCT/JP2012/068506.
Communication dated Feb. 24, 2016, from the European Patent Office in counterpart European patent application No. 12815121.4.
Notification of Reasons for Refusal dated Sep. 17, 2015 from the Japanese Patent Office in counterpart Japanese patent application No. 2012-002069.
The First Office Action dated Nov. 2, 2015 from the State Intellectual Property Office of People's Republic of China in counterpart Chinese patent application No. 201280036233.6.

* cited by examiner

WIRE HARNESS AND METHOD OF MAINTAINING SHAPE THEREOF

CROSS REFERENCE TO RELATED APPLICATION

This application is a continuation of PCT application No. PCT/JP2012/068506, which was filed on Jul. 20, 2012, based on Japanese Patent Applications Nos. 2011-160139 filed on Jul. 21, 2011, and 2012-002069 filed on Jan. 10, 2012, the contents of which are incorporated herein by reference.

BACKGROUND OF THE INVENTION

1. Technical Field

The invention relates, in general, to a wire harness, particularly having a function of maintaining a shape thereof, which has a sheathing member for protecting a plurality of wires, and a method of maintaining a shape of the wire harness.

2. Background Art

A wire harness disclosed in JP-A-2004-224156 is a wire harness that is bent along an arranging path thereof with respect to a metal pipe for protecting electric wires. The wire harness disclosed in JP-A-2004-224156 includes three high-voltage electric wires and three metal protection pipes which respectively receive the three high-voltage electric wires for protection.

The high-voltage electric wire connects a motor mounted at a front portion of a vehicle and a battery mounted at a middle or rear portion of the vehicle. The wire harness is arranged from the battery at the middle or rear portion of the vehicle to the motor at the front portion of the vehicle through an under-floor located outside a vehicle body frame.

The metal protection pipe is arranged to protect the high-voltage electric wire from pebbles or water. The metal protection pipe is arranged to be rigid enough to protect the high-voltage electric wire from pebbles or water and to prevent deformation of the high-voltage electric wire. Furthermore, since the metal protection pipe is made of metal, the metal protection pipe serves as an electromagnetic shield.

The wire harness is manufactured by inserting a high-voltage electric wire through a straight metal protection pipe and then bending the metal protection pipe along an arranging path of the wire harness at an under-floor of a vehicle, thereby forming a bent-type wire harness.

The bent-type wire harness manufactured in a manner as described above is then transported from a wire harness manufactory to a vehicle manufacturer's assembling factory.

In the assembling factory, the bent-type wire harness will be mounted at a predetermined position in the vehicle, thereby completing the arranging process.

SUMMARY OF INVENTION

According to JP-A-2004-224156, there is a disadvantage in that, when a plurality of wire harnesses are transported, a sufficient space is required between metal protection pipes and between wire harnesses in order to prevent the metal protection pipes from coming into contact with each other and being subjected to damage or deformation.

Further, another disadvantage arises in that a processing space is required because the metal protection pipe is bent in three dimensions.

In order to solve these problems, it is considered that a flexible sheathing member (e.g. a tube body) is used in place of the metal protection pipe.

However, the use of the sheathing member has following problems.

1) In the case of flexible sheathing member, it is difficult for the sheathing member to maintain a desired shape owing to the flexibility when mounted/aligned and after arranged.

2) In order to mount such a sheathing member while maintaining a desired shape, there is a need for a protector, which however is a member that is molded with resin to correspond to an arranging path of the wire harness, so the protector should be separately designed/provided for each vehicle, being of less generality and thus entailing high cost.

3) In respect of the protector, during the development, it is required to fabricate a prototype mold many times, so the design and fabrication of the protector will be costly and time-consuming.

4) Since use of the protector causes a mounting part for the sheathing member to be made larger, if provided at an under-floor of a vehicle, the protector is close to the ground, causing many problems.

Accordingly, the present invention has been made keeping in mind the above problems, and an object of the present invention is to provide a wire harness which uses a flexible sheathing member in place of a metal protection pipe, with the configuration that can maintain a desired shape of the sheathing member without using a protector.

In order to solve the problem, the present invention provides a wire harness (1) to (4) having the following characteristics.

(1) A wire harness including:

a conduction path; and a flexible sheathing member through Which the conduction path passes and which has recessed sections and protruded sections, the recessed sections and the protruded sections extending in a circumferential direction on the surface of the sheathing member and being formed alternately along a longitudinal direction of the sheathing member, wherein a curing-type adhesive or resin containing the adhesive is supplied to the recessed sections of a bent part which is formed when the wire harness is bent, and cured while the bent part is maintained in a bent shape.

(2) In the wire harness of (1), a tape is wrapped around the bent part in which the curing-type adhesive or the resin containing the adhesive is supplied and cured.

(3) in the wire harness of (1), the curing-type adhesive or the resin containing the adhesive is applied and cured on the protruded sections as well as the recessed sections of the bent part.

(4) In the wire harness according to any one of (1) to (3), the curing-type adhesive of the resin containing the adhesive is supplied and cured in at least the recessed sections of a straight part of the sheathing member Which is used in a not-bent state.

Further, the present invention provides a method (5) of maintaining a wire harness to have a desired shape, the method having the following characteristic.

(5). A method of maintaining a wire harness to have a desired shape, the wire harness including a conduction path and a flexible sheathing member through which the conduction path passes, includes:

preparing, as the sheathing member, a sheathing member having protruded sections and recessed sections extending in the circumferential direction on the surface thereof and being formed alternately along the longitudinal direction thereof;

forming a bent part by bending the sheathing member;

supplying a curing-type adhesive of resin containing the adhesive to the recessed sections of the bent part; and curing the curing-type adhesive or the resin containing the adhesive while the sheathing member is maintained in a bent shape, wherein the sheathing member is maintained in a desired shape.

According to the wire harness (1) and the method (5) of maintaining the shape of the wire harness, with the configuration in which the curing-type adhesive or the resin containing the adhesive is applied (placed) and cured in the recessed sections of the bent part which is formed when the sheathing member is bent, the adjacent protruded sections are spaced at fixed distances while the sheathing member is maintained in a bent shape.

Further, according to the wire harness (2), with the configuration in which the bent part is wound with the tape after the curing-type adhesive or the resin containing the same is cured while the bent part is maintained in the bent shape, the detachment of the curing-type adhesive or the resin containing the adhesive can be prevented and the bent shape of the bent part is maintained.

Further, according to the wire harness (3), with the configuration in which the entire outer portion of the bent part is covered with the curing-type adhesive or the resin containing the adhesive, the detachment of the curing-type adhesive or the resin containing, the adhesive can be prevented and the bent shape of the bent part is maintained. Further, since a tape-winding process is not required, working efficiency can be improved.

Further, according to the wire harness (4), with the configuration in which the straight part s also covered with the curing-type adhesive or the resin containing the adhesive, the bent shape of the bent part can be maintained while the straight part is maintained in a straight form.

As set forth in the foregoing, the present invention has the effect that the sheathing member for covering the conduction path can be maintained in a desired shape even without using the protector.

Further, the present invention has the effect that the generality thereof in use increases because the protector is not used.

Further, the present invention uses the curing-type adhesive or the resin containing the same as substitutes of the protection molded with resin, and thus does not require dedicated parts and dies for vehicles. This contributes to a reduction in the manufacturing cost of the wire harness.

Furthermore, since the protector is not used, low weight/small size can be obtained.

DESCRIPTION OF EMBODIMENTS

A wire harness of the present invention will now be described in detail with reference to the accompanying drawings.

Although the description will exemplarily illustrate a hybrid vehicle, the present invention is not limited thereto, but may also be adapted to an electric vehicle.

<Hybrid Vehicle>

Figure 1:
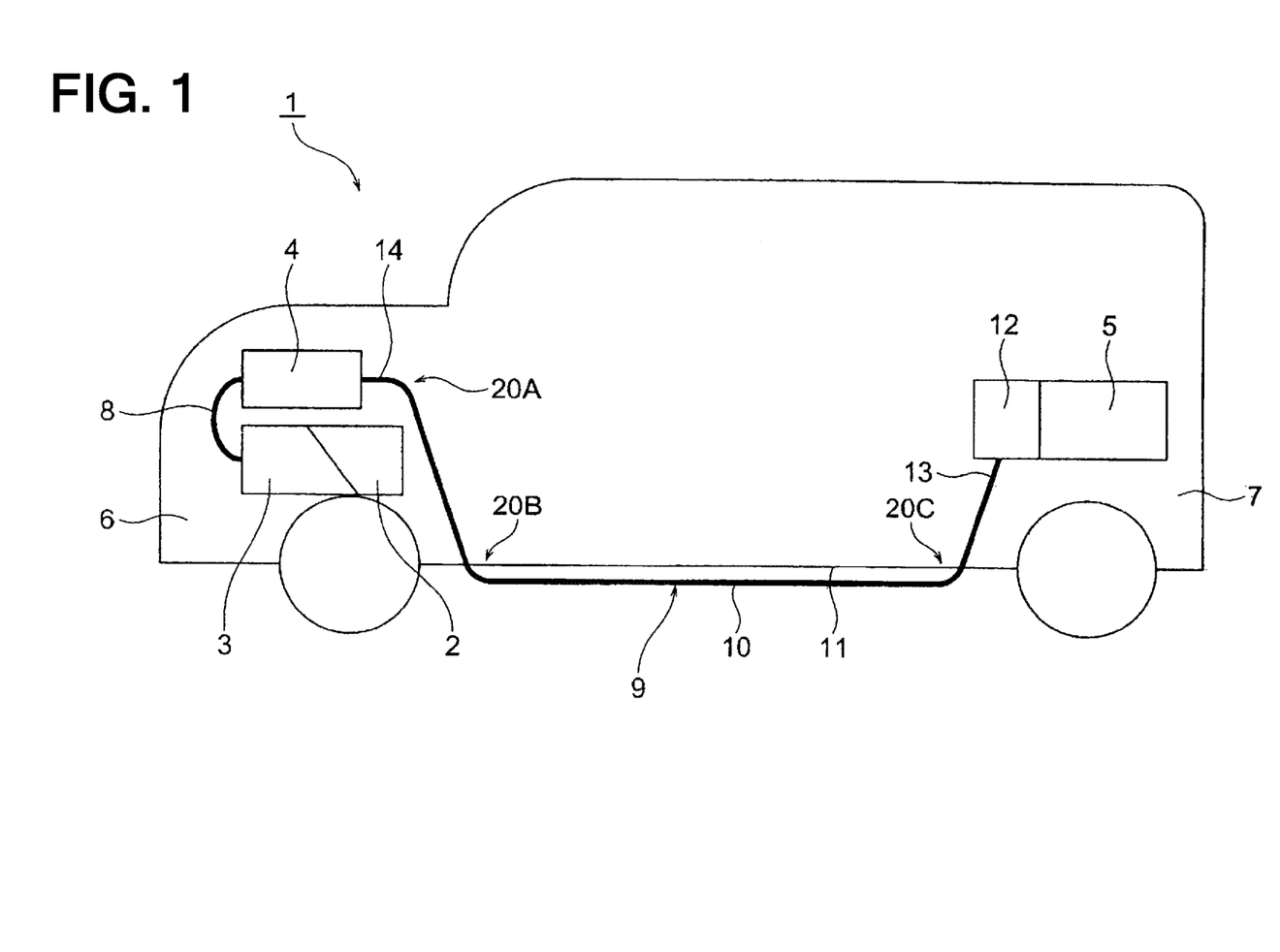
FIG. 1 is a schematic view showing an example of the case where a wire harness according to the present invention is disposed to a hybrid vehicle.

FIG. 1 is a pictorial view showing an example of a wire harness which is adapted to a hybrid vehicle.

The hybrid vehicle 1 shown in FIG. 1 is a vehicle that is driven by combined power from an engine 2 and a motor unit 3.

The engine 2, the motor unit 3, and an inverter unit 4 are mounted to an engine room 6 on the side of front Wheels. A battery 5 is mounted to a rear portion 7 of the vehicle on the side of rear wheels. The battery 5 may be mounted to the interior of the vehicle which is located on the rear side of the engine room 6.

The inverter unit 4 and the battery 5 are connected by the wire harness 9 for high-voltage applications at both ends thereof such that a middle portion 10 thereof is arranged along an under-floor 11 of the vehicle.

Although the motor unit 3 and the inverter unit 4 are connected by a high-voltage wire harness 8 known in the related art, the motor unit 3 and the inverter unit 4 may be connected by the wire harness 9 according to the present invention.

A rear end 13 of the wire harness 9 is coupled to a wire block 12 via a connector, and a front end 14 of the wire harness 9 is coupled to the inverter unit 4 via a connector.

<Motor Unit 3>

The motor unit 3 is a motor assembly that includes a motor and a generator, which are disposed in the motor unit, and a shield casing. The motor of the motor unit 3 is supplied with power from the junction block 12 provided to the battery (a battery pack) 5 on the rear side of the vehicle via the inverter unit 4 on the front side of the vehicle by means of the wire harness 9 according to the present invention.

<Inverter Unit 4>

The inverter unit 4 accommodates an inverter which converts a direct current to an alternating current, and a converter which converts an alternating current to a direct current. Further, the inverter unit 4 is formed as an inverter assembly which includes a shield casing.

<Battery 5>

The battery 5 is a nickel-metal hydride (Ni—NH) rechargeable battery or a lithium-ion secondary battery which is modulated. If applicable to a hybrid vehicle or an electric vehicle, the battery 5 may not be limited to a specified type. Further, it is possible to employ a storage device such as a capacitor.

<Wire Harness 9 According to the Present Invention>

A wire harness 9 according to a first embodiment of the present invention will now be described in detail with reference to FIGS. 2 to 4C.

Figure 2:
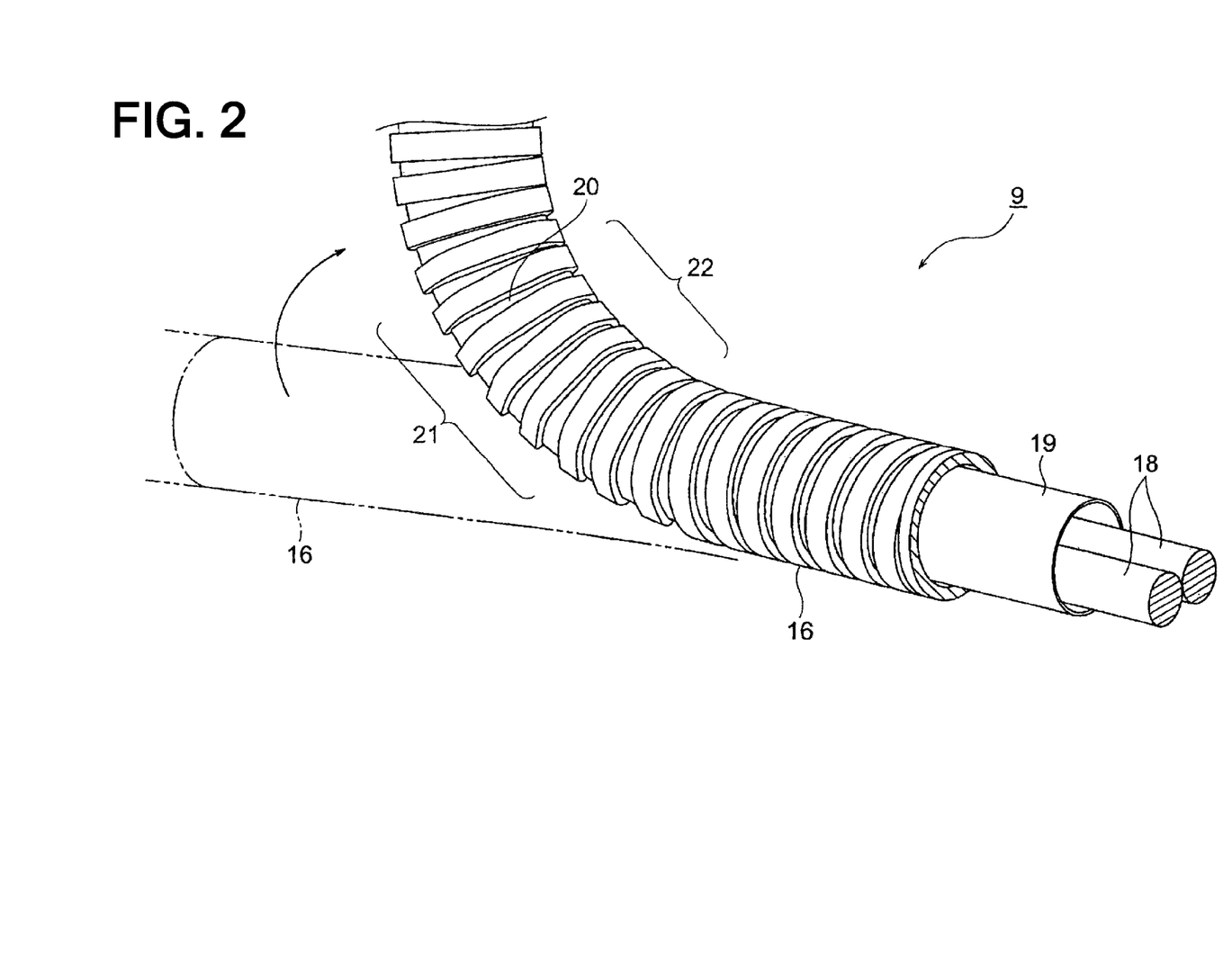
FIG. 2 is a perspective view showing the exterior of the wire harness that is bent from an initial state.

FIG. 2 is a perspective view showing the exterior of the wire harness which is bent from an initial straight state. The wire harness 9 shown in FIG. 2 includes two electric wires 18, an electromagnetic shield 19 which shields the two electric wires in a lump, and a corrugated tube 16 which is provided outside the electromagnetic shield 19 as a sheathing member. The electric wire 18, the electromagnetic shield 19, and the corrugated tube 16 serving as the sheathing member will be described in brief.

<<Electric Wire 18>>

The electric wire 18 is a conduction path including a conductor and an insulator, and is formed so as to have sufficient length required for electrical connection. Connectors are respectively provided at both ends of the electric wire 18, and are connected to connectors of the junction block 12 (FIG. 1) and the inverter unit 4 (FIG. 1), respectively.

The conductor is made of copper, copper alloy, aluminum, aluminum alloy or the like, and has a conductive structure which is formed by twisting strands. However, the conductor may be a rod-type conductive structure which has a rectangular section or a circular section (e.g., a flat-type single core structure or a circular-type single core structure).

Although this embodiment illustrates two electric wires 18 as a conduction path, the number of the conduction paths is not limited to 2, and the conduction path is not limited to the electric wire. For example, the present invention may employ a high-voltage conduction path in which an insulator is provided on a known bus-bar, or a combined-type high-voltage coaxial conduction path in which n circuit sections are coaxially formed into a single circuit unit.

<<Electromagnetic Shield 19>>

The electromagnetic shield 19 is a member which prevents an electric signal transmitted via the electric wire 18 from being influenced from an external electromagnetic wave. The electromagnetic shield has a barrel-type form which is composed of a shield member having a conductive metal foil or a single body of metal foil. The electromagnetic shield 19 has the substantially same length as the whole length of the two electric wires 18.

Although the electromagnetic shield 19 includes a metal foil in this embodiment, the present invention is not limited thereto. For example, if having the electromagnetic shielding effect the electromagnetic shield may be formed of braid which is woven into a barrel-type shape using thin conductive strands.

<<Corrugated Tube 16>>

The corrugated tube 16 is a flexible tubular sheathing member which is bendable. The corrugated tube is a resinous or metal tube (a corrugated box tube) which has a irregular portion (recessed sections and protruded sections) which is continuously formed on the outer circumferential surface in the longitudinal direction of the electric wire 18. Although the corrugated tube 16 is made of resin and has a circular sectional shape in this embodiment, the corrugated tube is not limited to the circular sectional shape, but may have other sectional shapes such as an oval, a rectangle or the like.

Referring again to FIG. 2, when the corrugated tube 16 is bent in the direction of arrow shown in FIG. 2 in a state Where the electromagnetic shield 19 covering the electric wires 18 is inserted through the corrugated tube 16 (i.e. when the corrugated tube is bent from the state shown with imaginary line in FIG. 2), a bent part 20 is formed. As shown in FIG. 1, the bent part 20 of the wire harness 9 consists of bent parts 20A, 20B, and 20C which turn from the interior of a vehicle towards the inverter unit 4; from the under-floor 11 of the vehicle towards the interior of the vehicle; and from the interior of the vehicle towards the under-floor 11, respectively.

<<Bent Part 20>>

The bent part 20 is a bent part of the wire harness 9, particularly the corrugated tube 16. Reference numeral 21 designated in the bent part 20 indicates an outer curvature portion where the curvature (R) is large. Reference numeral 22 indicates an inner curvature portion where the curvature (R) is small. When a person bends the corrugated tube 16 with his hands and then releases his hold on the corrugated tube, the corrugated tube returns to its initial state before bent under the action of the restoration force of its material.

Thus, according to the present invention, the shape of the bent part 20 can be maintained in such a manner as follows.

Figure 3:
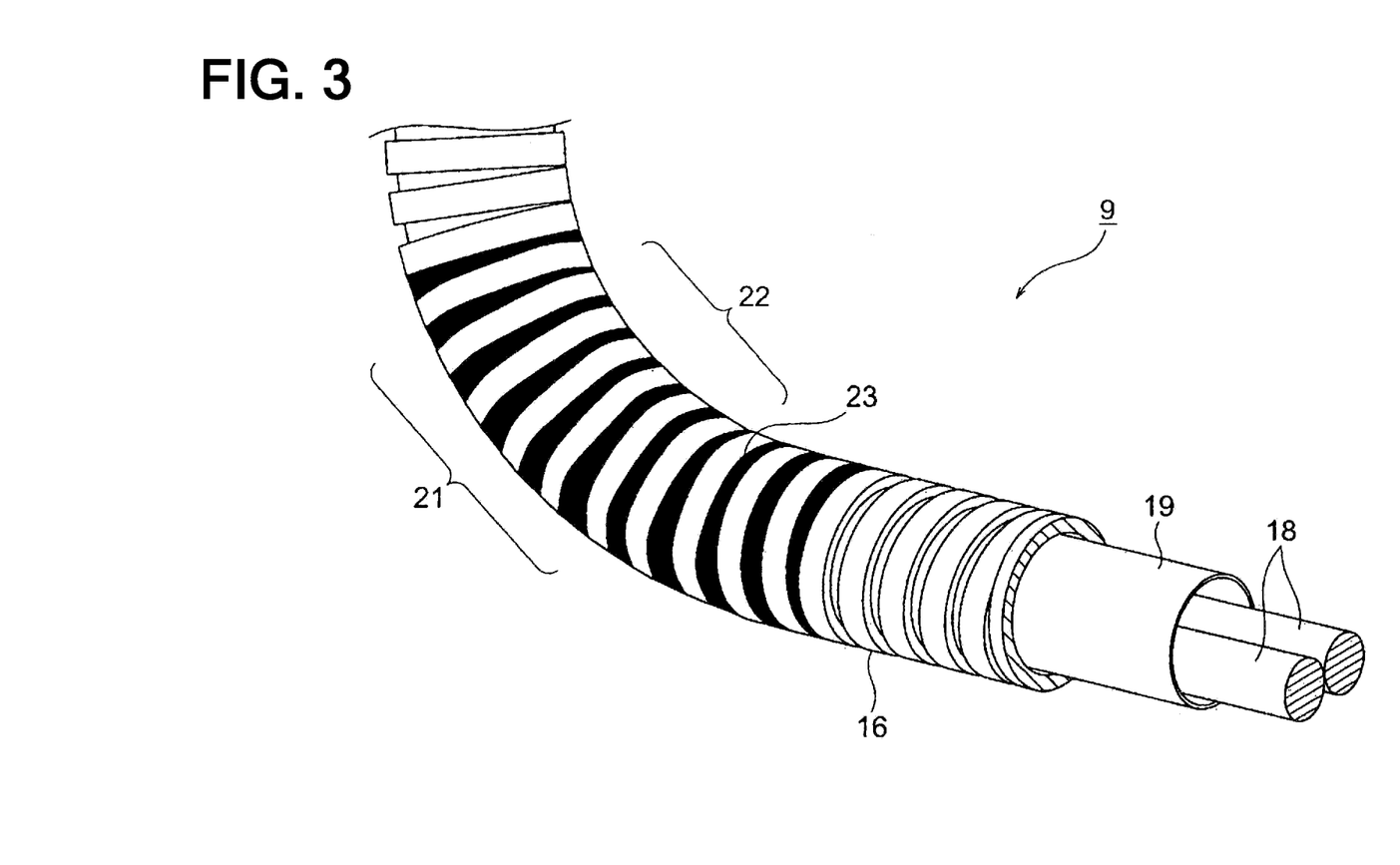
FIG. 3 is a perspective view showing the exterior of the wire harness in which an adhesive is applied to recessed sections after the wire harness is bent.

FIG. 3 is a perspective view showing the exterior of the wire harness in which the recessed sections of the corrugated tube are filled with an adhesive after the wire harness is bent. According to the present invention, when the recessed sections of the bent part 20 are filled with a hot-melt adhesive 23 (a portion painted in black in FIG. 3) as shown in FIG. 3 and then cured, the shape of the bent part 20 can be maintained. The principle that the shape of the bent part 20 can be maintained will be described in detail with reference to FIGS. 4A to 4C.

<Principle of Shape-Maintenance of Bent Part 20>

Figure 4A:
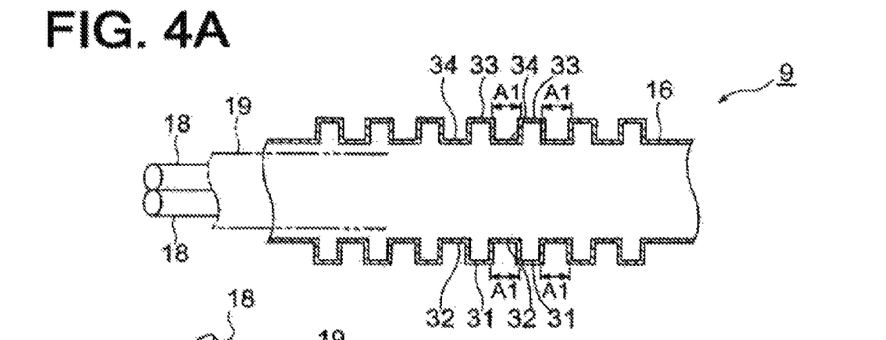
FIG. 4A is a view of longitudinal section showing a straight corrugated tube in the longitudinal direction thereof before the corrugated tube is bent.

<<Before Bending: FIG. 4A>>

FIG. 4A is a view of longitudinal section showing a straight corrugated tube 16 which is not yet bent. In this state, no force is applied to the corrugated tube 16, so that the corrugated tube 16 extends in a straight form. Thus, a distance (i.e. the pitch A1) between adjoining protruded sections 33 on one side (i.e. the upper portion in the figure) is the same as a distance (i.e. the pitch A1) between adjoining protruded sections 31 on the other side (i.e. the lower portion in the figure).

Figure 4B:
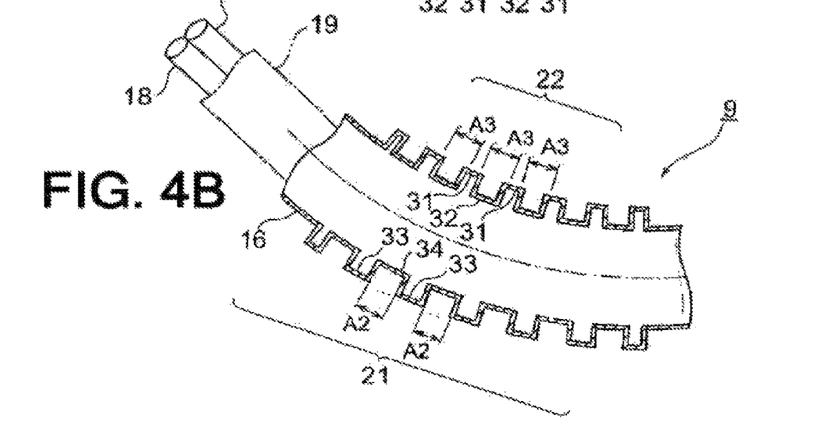
FIG. 4B is a view of longitudinal section showing the wire harness in the longitudinal direction thereof after the corrugated tube is bent.

<<Immediately after Bending: FIG. 4B>>

FIG. 4B is a view of longitudinal section showing the wire harness in the longitudinal direction thereof after the corrugated tube is bent. When the corrugated tube 16 is bent, a distance (i.e. the pitch A2) between adjoining protruded sections 33 on the outer curvature portion 21 (i.e. the lower portion in the figure) of the corrugated tube 16 becomes larger than the pitch A1. Further, a distance (i.e. the pitch A3) between adjoining protruded sections 31 on the inner curvature portion 22 (i.e. the upper portion in the figure) of the corrugated tube 16 becomes smaller than the pitch A1.

Here, if a person bends the corrugated tube 16 with his hands and then releases his hold on the corrugated tube, the corrugated tube 16 returns to its straight state shown in FIG. 4A, which is not yet bent, under the action of the restoration force, so that the bent shape of the wire harness 9 is not maintained.

Figure 4C:
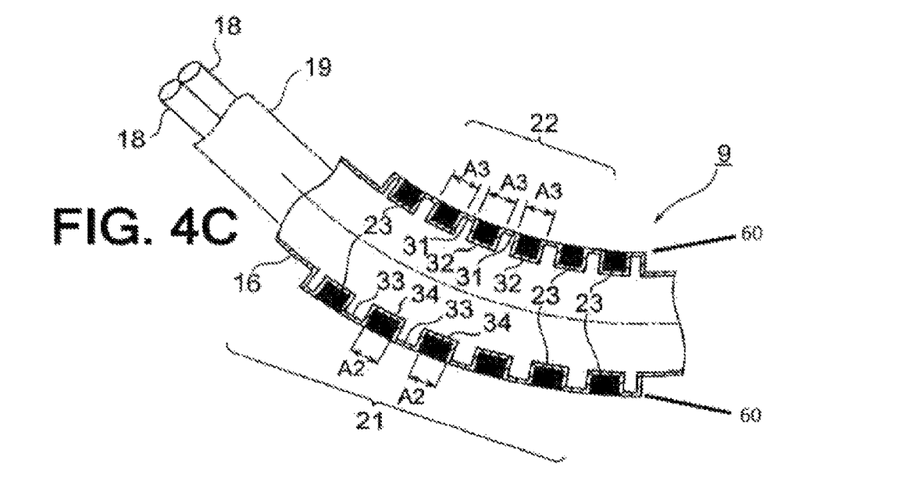
FIG. 4C is a view of longitudinal section showing the wire harness in the longitudinal direction thereof, wherein an adhesive is applied to recessed sections of a bent part of the corrugated tube shown in FIG. 4B.

<<After Filling Recessed Sections 32 and 34 of Bent Part 20 with Hot-Melt Adhesive 23: FIG. 4C>>

FIG. 4C is a view of longitudinal section showing the wire harness in the longitudinal direction thereof, wherein the recessed sections of the bent part of the corrugated tube shown in FIG. 4B is filled with an adhesive.

After the corrugated tube 16 is bent so as to form a bent part 20, a hot-melt adhesive 23 [a portion painted in black in FIG. 4C] is applied to recessed sections 32 and 34 of the bent part 20, and then the bent part 20 is maintained in the bent state for a moment until the hot-melt adhesive is cured.

When the hot-melt adhesive is cured, the distance (pitch A2) between adjacent protruded sections 33 on the outer curvature portion 21 of the corrugated tube 16 is fixedly maintained. Further, the distance (pitch A3) between adjacent protruded sections 31 on the inner curvature portion 22 of the corrugated tube 16 is also fixedly maintained. Thus, all of the distance A2 on the outer curvature portion 21 and the distance A3 on the inner curvature portion 22 do not return to the distance A1.

Thus, the distance between the adjacent protruded sections 33 on the outer curvature portion 21 and the distance between the adjacent protruded sections 31 on the inner curvature portion 22 can be maintained constant. Moreover, as shown in FIG. 4C, the hot-meld adhesive 23 applied to the recessed sections 32 and 34 of the bent part 20 creates a planar surface 60 with the protruded sections 31, 33 of the bent part 20.

According to the present invention, the bent part 20 of the corrugated tube 16 can be maintained in the bent shape (i.e. the path can be maintained) even without using a protector.

<<Hot-Melt Adhesive 23 Used in the Present Invention>>

The hot-melt adhesive 23 is a curing-type adhesive which, for example, shows, at room temperature, a solid state, which is melted by heat, so that, when used, the liquefied adhesive is applied to a target object and then is solidified at room temperature. Otherwise, the adhesive is of a type which is cured by heating.

The hot-melt adhesive 23 is bonded to the target object within a short time, improving the working efficiency.

<<Equivalent Adhesive to Hot-Melt Adhesive 23>>

Beside the hot-melt adhesive 21, the present invention can employ other adhesive such as, for example, high strength foam filler, 2-liquid phase reactive adhesive (epoxy resin adhesive or the like), polyurethane resin adhesive, or polyethylene ether adhesive, which is known in the related art, so a detailed description thereof will be omitted.

The hot-melt adhesive 23 and the equivalent adhesive will be referred herein to a 'curing-type adhesive'.

As described before, the present invention can provide the wire harness 9 which is provided with the corrugated tube 16 which can be maintained in a desired shape, and which does not need a protector for a sheathing member, so that the wire harness can be widely used at low cost.

The present invention can also provide the new effects when diversely modified without departing from the spirit of the present invention.

First to fifth modified embodiments of the present invention will now be described.

First Modified Embodiment

Hot-Melt Adhesive 23 of Bent Part 20 Wrapped with Tape 17

Figure 5A:
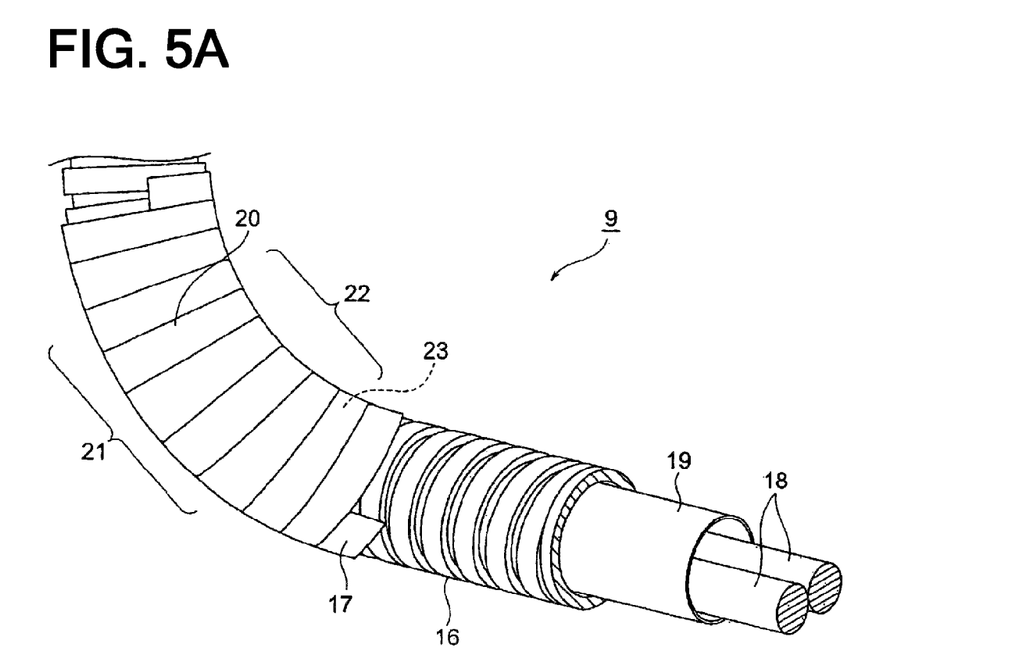
FIG. 5A is a perspective view showing the exterior of the wire harness (see FIG. 3) filled with the adhesive, in which a tape is wound around the bent part thereof.
Figure 5B:
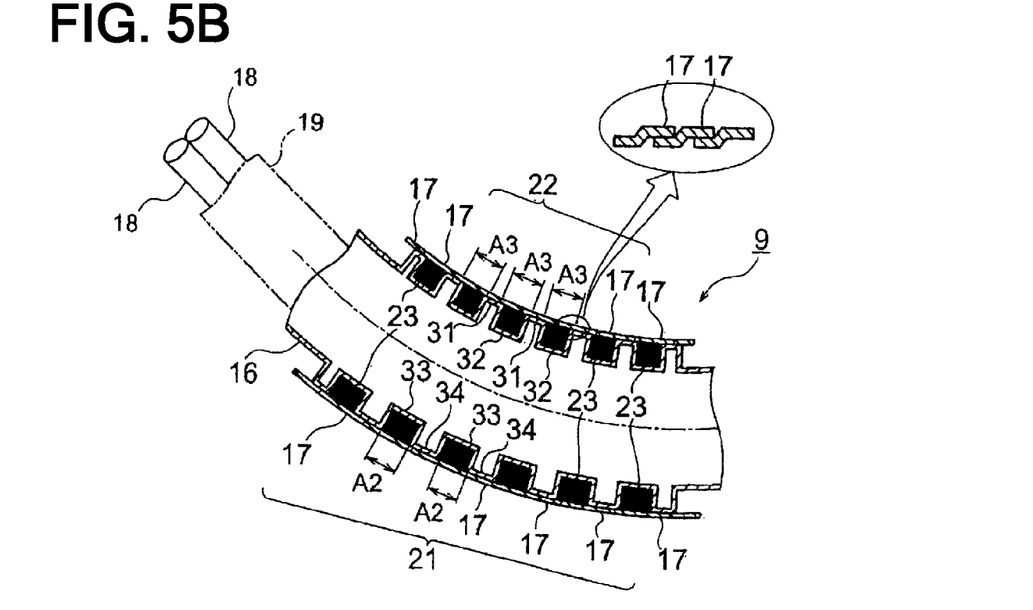
FIG. 5B is a view of longitudinal section showing the wire harness shown in FIG. 5A in the longitudinal direction thereof.

FIGS. 5A and 5B show the first modified embodiment, wherein FIG. 5A shows the exterior of the wire harness in which the bent part 20, to which an adhesive is applied, is wrapped with a tape, and FIG. 5B shows a view of longitudinal section illustrating the wire harness in the longitudinal direction thereof.

The first modified embodiment is the same as the above embodiment [FIG. 4C] in that, after the corrugated tube 16 is bent so as to form the bent part 20, the hot-melt adhesive 23 is applied to the recessed sections 32 and 34, and then the bent part 20 is maintained in the bent shape until the hot-melt adhesive 23 is cured.

According to the first modified embodiment, after the hot-melt adhesive 23 has been cured, as shown in FIGS. 5A and 5B, the corrugated tube 16 is wrapped with the tape 17 in such a manner as to cover the hot-melt adhesive 23 which has been applied to the recessed sections 32 and 34 [FIG. 5B] of the bent part 20. The tape 17 is applied with an adhesive at one side thereof, which is wrapped around the corrugated tube 16. For example, as shown in FIG. 5B, the tape 17 is wrapped around the bent part 20 using a so-called half-lapping method in which, whenever the tape is wrapped one turn around the circumference of the corrugated tube 16, the tape overlaps partly with the just previously wrapped turn [see the enlarged view of FIG. 5B].

When the entire bent part is wrapped with the tape 17, the recessed sections 32 and 34 are blocked by the tape 17, so that the hot-melt adhesive 23 can be surely prevented from being released from the recessed sections 32 and 34 by means of the tape 17. That is, the tape 17 is wrapped around the corrugated tube in order to prevent the release of the hot-melt adhesive 23. The tape 17 will now be described in brief:

<<Tape 17>>

If serving to prevent the release of the hot-melt adhesive 23 from the recessed sections 32 and 34, the tape 17 may have any of materials.

Further, although the tape is of a colored or colorless tape, the colored tape is advantageously used for the following effects.

<<Effects of Colored Tape>>

It is advantageous to use an orange-colored tape because the wire harness 9 is applied for high voltage. This is because a worker can instantly discern that the wire harness is being used in a high-voltage vehicle when seeing the orange-colored tape, contributing to an improvement of working efficiency or prevention of working errors.

Second Modified Embodiment

Application of Hot-Melt Adhesive 47 to Entire Bent Part

Figure 6A:
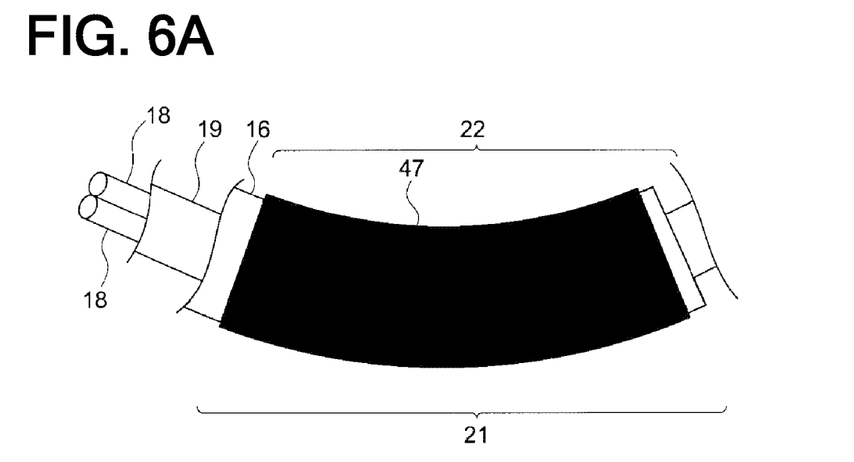
FIG. 6A is a plan view of a wire harness in which the entire surface of a bent part thereof is applied with a curing-type adhesive.
Figure 6B:
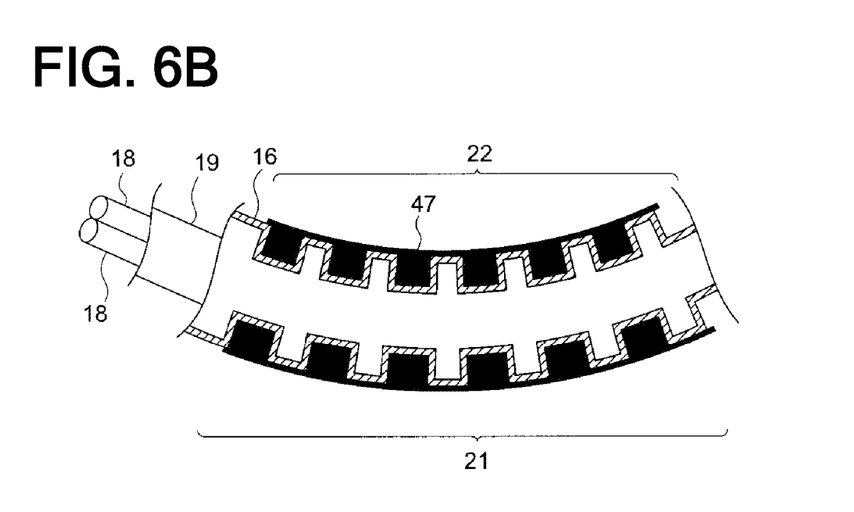
FIG. 6B is a cross-sectional view of the wire harness shown in FIG. 6A in the longitudinal direction thereof.

FIGS. 6A and 6B show the second modified embodiment, wherein FIG. 6A shows a plan view of a wire harness in which an adhesive is applied to the entire surface of a bent part, and FIG. 6B shows a cross-sectional view of the wire harness shown in FIG. 6A in the longitudinal direction thereof. As can be seen from FIGS. 6A and 6B, the second modified embodiment is characterized in that a hot-melt adhesive 47 is additionally applied to protruded sections as well as recessed sections on both outer and inner curvature portions 21 and 22 [see reference numeral 23 in FIG. 4C], thereby covering the entire surface of the bent part.

According to this configuration, since the hot-melt adhesive 47 is applied to all of the recessed sections and the protruded sections bent part, the hot-melt adhesive 47 applied to the protruded sections can prevent the release of the hot-melt adhesive 47 applied to the recessed sections.

Thus, this can provide the same effect as in the first modified embodiment in which the bent part 20 is wrapped with the tape 17. Further, since it is sufficient to simply carry out a filling/application process, the working process is simple and the working time can be shortened further than in tape-wrapping.

Third Modified Embodiment

Use of Adhesive Contained Resin 53

Figure 7A:
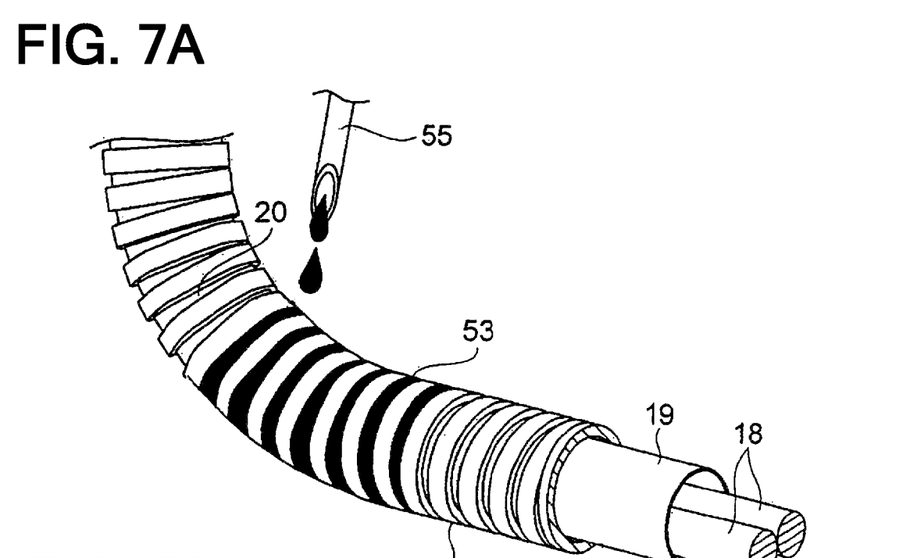
FIG. 7A is a perspective view showing the exterior of a bent wire harness while an adhesive contained resin is being supplied to recessed sections of a corrugated tube thereof.
Figure 7B:
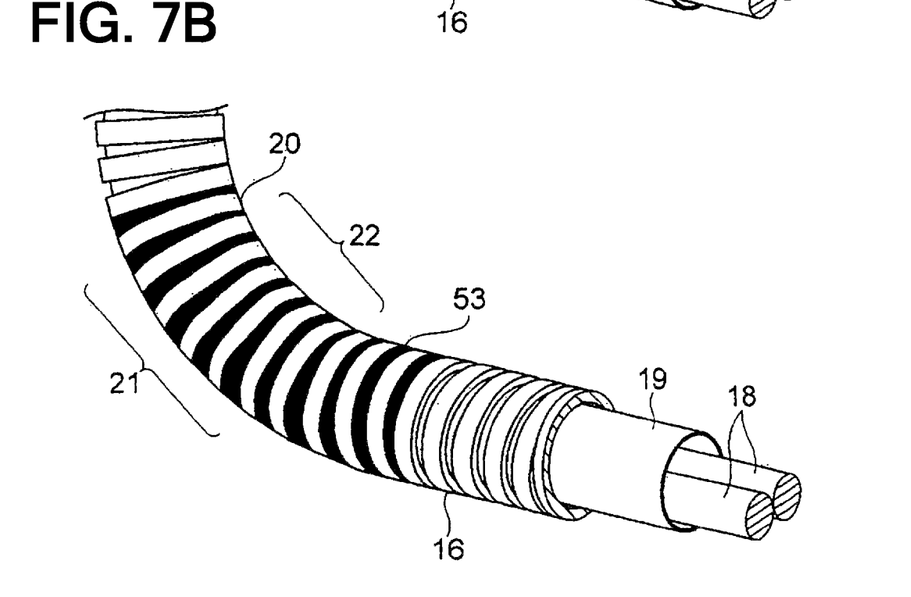
FIG. 7B is a perspective view showing the exterior of the wire harness after the adhesive contained resin has been completely supplied to the entire recessed sections of a bent part thereof.

An example of the third modified embodiment is illustrated in FIGS. 7A and 7B.

FIG. 7A is a perspective view showing the exterior of a bent wire harness while an adhesive contained resin is being applied to recessed sections of a bent part of a corrugated tube thereof, and FIG. 7B is a perspective view showing the exterior of the wire harness after the adhesive contained resin has been completely applied to the entire surface of the bent part.

When the adhesive contained resin 53 (a portion painted in black) is applied to the recessed sections of the bent part 20 through a nozzle 55 as shown in FIG. 7A, the adhesive contained resin 53 is solidified/cured as show in FIG. 7B, so that the bent part 20 can be maintained in the bent state (i.e. the path can be maintained).

FIG. 7B and FIG. 3 are different from each other in that the embodiment of FIG. 3 employs the hot-melt adhesive 23, whereas the embodiment of FIG. 7B employs the adhesive contained resin 53 which will be described below.

<<Adhesive Contained Resin 53>>

The adhesive contained resin 53 is a material in which an adhesive is mixed with the same resinous material as the sheathing member (tubular body). Particularly, the adhesive contained resin is a material in which an adhesive is mixed with a incited resinous material [here, polypropylene (PP)] of the corrugated tube 16. When cured, the adhesive contained resin has the same function as the hot-melt adhesive 23.

Like this, when the adhesive contained resin 53, which is in a melted state, is supplied through the nozzle 55 as shown in FIG. 7A, and at the same time, is cured, the bent part 20 is maintained in the bent state (i.e. the path is maintained).

If having a dispensing function, other elements can be used to supply the adhesive contained resin 53 without using the nozzle 55. The adhesive contained resin may be supplied via application and filling as well as droppage.

Although FIG. 7A illustrated that the adhesive contained resin 53 is supplied to the portion where recessed sections of the bent part 20 has narrow pitch (the upper narrow portion in the figure), this modified embodiment is not limited thereto. The adhesive contained resin 53 may be supplied to the opposite portion where the recessed sections has wide pitch (the lower wide portion in the figure), the lateral side of the bent part 20 (the side in the figure towards the upper surface or undersurface) or the like.

Fourth Modified Embodiment

Application of Adhesive Contained Resin 53 to Entire Bent Part

Figure 8A:
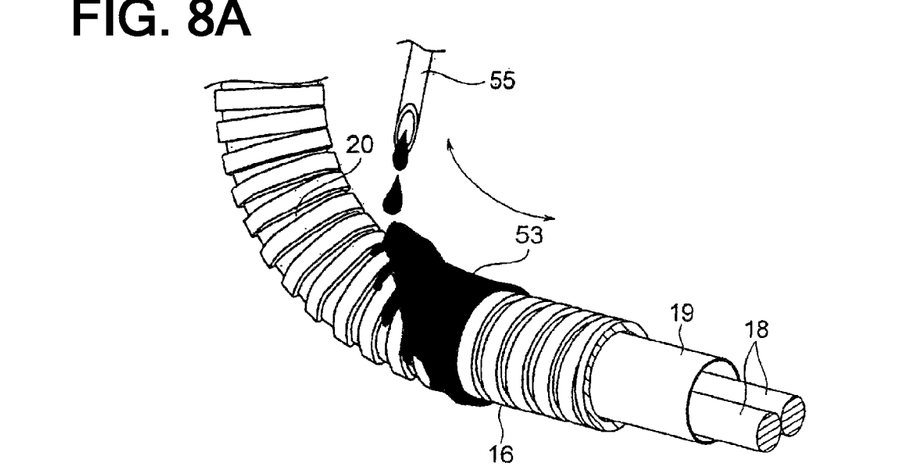
FIG. 8A is a perspective view showing the exterior of a wire harness while an adhesive contained resin is being supplied to the entire surface of a bent part thereof.
Figures 8B, 8C:
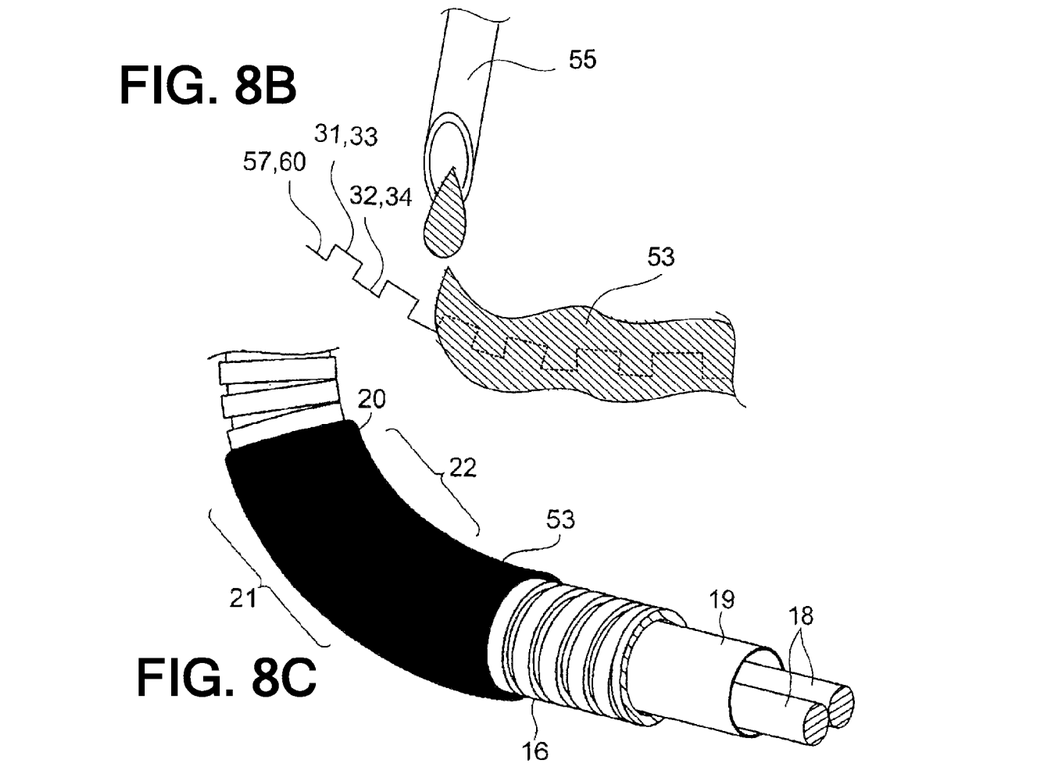
FIG. 8B is an enlarged pictorial view showing the longitudinal section of the section where the resin is supplied.
FIG. 8C is a perspective view showing the exterior of the wire harness after the adhesive contained resin has been completely supplied to the entire surface of the bent part thereof.

An example of the fourth modified embodiment is illustrated in FIGS. 8A to 8C.

FIG. 8A is a perspective view showing the exterior of a wire harness while an adhesive contained resin is being supplied to the entire surface of a bent part thereof, FIG. 8B is an enlarged pictorial view showing the longitudinal section of the section where the resin is supplied, and FIG. 8C is a perspective view showing the exterior of the wire harness after the adhesive contained resin has been completely supplied to the entire surface of the bent part.

The configuration of FIG. 8A is characterized in that the adhesive contained resin 53 is supplied to protruded sections as well as recessed sections of the bent part, thereby covering the entire surface of the bent part with the adhesive contained resin 53. When the adhesive contained resin 53 (a portion painted in black) is supplied to both the recessed sections and the protruded sections of the bent part 20 through the nozzle 55 as shown in FIG. 8A, the adhesive contained resin 53 spreads throughout both the recessed section and the protruded sections as shown in FIG. 8B, finally covering the entire surface of the bent part 20 as shown in FIG. 8C. Then, the adhesive contained resin is solidified/cured so as to maintain the bent state (the path) of the bent part 20.

According to this configuration, since the adhesive contained resin is provided in the recessed sections and around the protruded sections, the resin 53 provided to the protruded section can advantageously prevent the release of the cured resin 53 provided in the recessed sections.

Thus, this can provide the same effect as in the first modified embodiment in which the bent part 20 is wrapped with the tape 17.

Further, since it is sufficient to simply carry out the droppage of the adhesive contained resin 53, the working time can be shortened further than in the wrapping of the tape 17.

Fifth Modified Embodiment

Shape-Maintenance of Straight Part

Figure 9A:
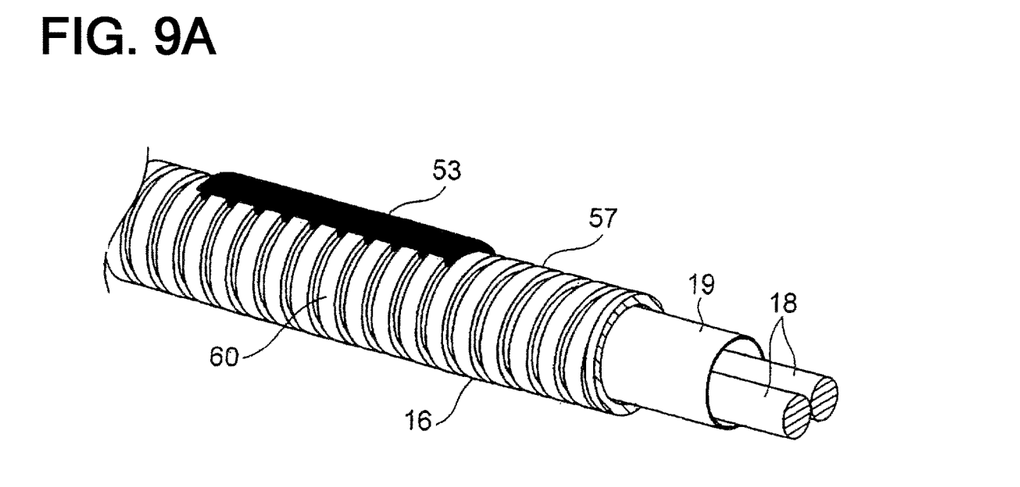
FIG. 9A is a perspective view showing the exterior of a wire harness while an adhesive contained resin is being supplied to the surface of a straight part which is not intended to bend.
Figure 9B:
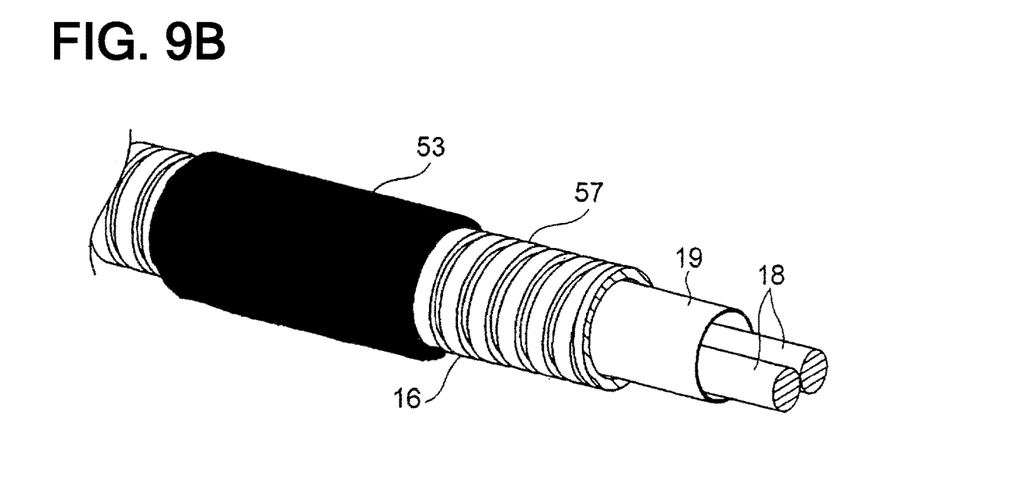
FIG. 9B is a perspective view showing the exterior of the wire harness after the adhesive contained resin has been completely applied to the entire surface of the straight part.

An example of the fifth modified embodiment is illustrated in FIGS. 9A and 9B.

FIGS. 9A and 9B show the case where a straight part which is not intended to bend is maintained in a straight form, wherein FIG. 9A is a perspective view showing the exterior of a wire harness while an adhesive contained resin is being supplied to the surface of a portion of the straight part that is not intended to bend, and FIG. 9B is a perspective view showing the exterior of the wire harness after the adhesive contained resin has been completely supplied to the entire surface of the straight part.

Although, if applied with no external force, the straight part 57 of the corrugated tube 16 in the wire harness 9 naturally extends straight owing to restoration force of its material, if applied with external force, the straight part is bent. Thus, if it is intended to securely maintain the straight part to be straight, the fifth modified embodiment is adapted.

According to the fifth modified embodiment, the adhesive contained resin is applied or dropped onto a part of the surface of the portion 60 of the straight part 57 which is not intended to bend while the portion is maintained to be straight in the longitudinal direction of the tube, finally covering the adhesive contained resin 53 over the entire surface of the portion 60 which is not intended to bend as shown in FIG. 9B. Then, the adhesive contained resin is solidified/cured, so that the straight part 57 of the corrugated tube 60 is maintained to be straight (i.e. the path is maintained).

In the meantime, instead of the adhesive contained resin 53, the hot-melt adhesive 23 may also be supplied or applied to the part of the surface of the portion 60 which is not intended to bend.

While the invention has been described with reference to exemplary embodiments, it will be understood by those skilled in the art that various changes may be made and equivalents may be substituted for elements thereof without departing from the scope of the invention.

REFERENCE NUMERALS LIST

1: Hybrid vehicle
2: Engine
3: Motor unit
4: Inverter unit
5: Battery
6: Engine room
7: Rear portion of vehicle
8: High-voltage wire harness
9: Wire harness
10: Middle portion
11: Under-floor of vehicle
12: Junction block
13: Rear end
14: Front end
16: Corrugated tube (Sheathing member)
17: Tape
18: Electric wire (Conduction path)
19: Electromagnetic shield
20: Bent part
21: Outer curvature portion
22: inner curvature portion
23: Hot-melt adhesive (Curing-type adhesive)
31 and 33: Protruded section
32 and 34: Recessed section
47: Hot-melt adhesive (Curing-type adhesive
53: Adhesive contained resin
55: Nozzle
57: Straight part
60: Portion which is not intended to bend

What is claimed is:

1. A wire harness comprising:
   a conduction path; and
   a flexible sheathing member through which the conduction path passes and which has recessed sections and protruded sections, the recessed sections and the protruded sections extending in a circumferential direction on the surface of the sheathing member and being formed alternatively along a longitudinal direction of the sheathing member,
   wherein a curing-type adhesive or resin containing the adhesive is supplied to only the recessed sections of a bent part which is formed when the wire harness is bent, and cured while the bent part is maintained in a bent shape, and
   wherein a tape is wrapped around the bent part in which the curing-type adhesive or the resin containing the adhesive is supplied and cured.

2. The wire harness according to claim 1, wherein the curing-type adhesive or the resin containing the adhesive is supplied and cured in at least the recessed sections of a straight part of the sheathing member which is used in a not-bent state.

3. The wire harness according to claim 1, wherein the curing-type adhesive or resin supplied to the recessed sections of the bent part creates a planar surface with the protruded sections the bent part.

* * * * *